United States Patent
Wiley et al.

(10) Patent No.: US 7,876,643 B2
(45) Date of Patent: Jan. 25, 2011

(54) METHODS OF HYDROCARBON DETECTION USING WAVELET DOMINANT FREQUENCY AND A MEASURE OF ENERGY LOSS ON THE HIGH-FREQUENCY SIDE OF WAVELET DOMINANT FREQUENCY

(75) Inventors: Robert W. Wiley, Sugar Land, TX (US); Scott W. Peters, Houston, TX (US); Peter H. Wilson, Houston, TX (US)

(73) Assignee: Apex Spectral Technology, Inc., Houston, TX (US)

( * ) Notice: Subject to any disclaimer, the term of this patent is extended or adjusted under 35 U.S.C. 154(b) by 750 days.

(21) Appl. No.: 11/903,602

(22) Filed: Sep. 24, 2007

(65) Prior Publication Data

US 2009/0080289 A1    Mar. 26, 2009

(51) Int. Cl.
*G01V 1/00* (2006.01)
(52) U.S. Cl. ......................................................... 367/73
(58) Field of Classification Search .................... 367/73, 367/49
See application file for complete search history.

(56) References Cited

U.S. PATENT DOCUMENTS

| | | | |
|---|---|---|---|
| 5,173,880 A | * | 12/1992 | Duren et al. ................... 367/73 |
| 5,414,674 A | | 5/1995 | Lichman |
| 5,583,825 A | | 12/1996 | Carrazzone et al. |
| 6,092,025 A | | 7/2000 | Neff |
| 7,243,029 B2 | | 7/2007 | Lichman et al. |

OTHER PUBLICATIONS

PCT Notification of Transmittal of The International Search Report and The Written Opinion of the International Search Authority, or the Declaration; Mar. 25, 2009 (10 pages).

* cited by examiner

*Primary Examiner*—Mark Hellner
(74) *Attorney, Agent, or Firm*—Osha • Liang LLP

(57) ABSTRACT

A method in accordance with one embodiment of the invention includes obtaining seismic trace data for a region of interest; processing the seismic trace data to calculate at least one spectrum for at least one sample from the seismic data; calculating at least one dominant frequency ($\omega_D$) for the at least one spectrum; calculating at least one measure of energy loss at frequencies above the at least one dominant frequency ($\omega_D$) on the at least one spectrum; and locating a hydrocarbon reservoir in the region of interest using the at least one dominant frequency ($\omega_D$) and the at least one measure of energy loss.

9 Claims, 5 Drawing Sheets

METHODS OF HYDROCARBON DETECTION USING WAVELET DOMINANT FREQUENCY AND A MEASURE OF ENERGY LOSS ON THE HIGH-FREQUENCY SIDE OF WAVELET DOMINANT FREQUENCY

FIELD OF THE INVENTION

This invention relates to methods and systems for hydrocarbon detection using seismic data.

BACKGROUND

Existing seismic exploration direct hydrocarbon detection methods primarily focus on the properties of the sound-reflecting boundaries present in the earth. These methods are founded on the theory that the strength of the sound reflection from the boundary itself is determined by certain lithological properties of rock within the layer above and the layer below a given boundary.

However, such reflection based methods are far from perfect. Reflections at each point on a boundary depends on at least eight variables (P-wave velocity above, S wave velocity above, density above, P wave velocity below, S wave velocity below, density below, angle of the incident ray path and bed thicknesses which may cause tuning effects or the lack thereof). The interplay between these variables makes it difficult to determine any particular one with accuracy.

Therefore methods that do not rely on the strength of the reflection boundary for direct detection are desirable.

SUMMARY

One aspect of the invention relates to methods for detecting hydrocarbons. A method in accordance with one embodiment of the invention includes obtaining seismic trace data for a region of interest; processing the seismic trace data to calculate at least one spectrum for at least one sample from the seismic data; calculating at least one dominant frequency ($\omega_D$) for the at least one spectrum; calculating at least one measure of energy loss at frequencies above the at least one dominant frequency ($\omega_D$) on the at least one spectrum; and locating a hydrocarbon reservoir in the region of interest using the at least one dominant frequency ($\omega_D$) and the at least one measure of energy loss.

Other aspects and advantages of the invention will be apparent from the following description and the appended claims.

BRIEF DESCRIPTION OF THE DRAWINGS

Reference will be made to the accompanying drawings which are described as follows.

DETAILED DESCRIPTION

Figure 1:
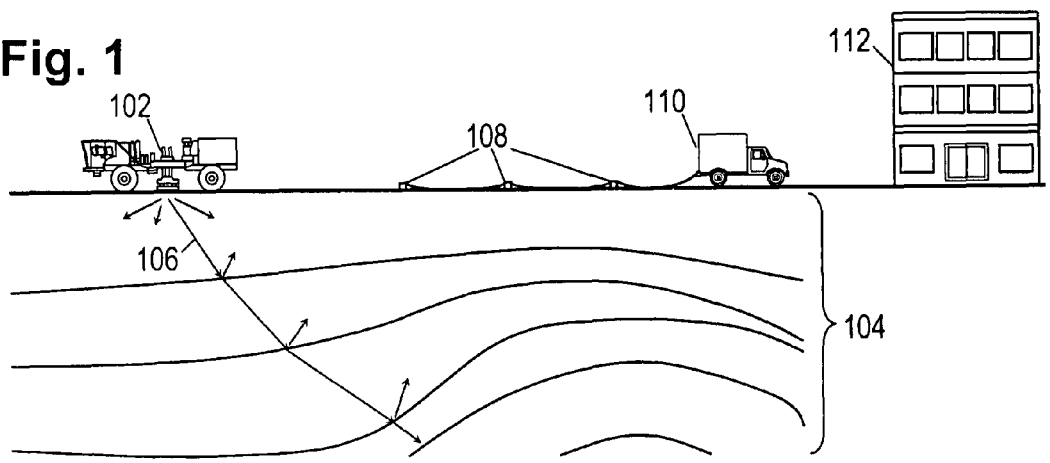
FIG. 1 shows an illustration in which hydrocarbon detection methods may be used.

Embodiments of the invention relate to methods and systems for hydrocarbon detection using seismic data. Specifically, embodiments of the invention rely upon deriving two measurements from seismic data and then combining the two measurements to create a third measurement as indication for hydrocarbon detection. Alternatively, the two derived measurements may be interpreted together to indicate hydrocarbon locations.

The two measurements derived from the seismic data include the dominant frequency ($\omega_D$) and the rate of energy loss on a spectrum above the dominant frequency ($\omega_D$).

Dominant frequency ($\omega_D$) may be identified from a spectrum at the maximum amplitude. One of ordinary skilled in the art would appreciate that the time domain seismic data may be converted into the frequency domain data sample by sample using any one of several transforms including, but not limited to the Fourier Transform or Fast Fourier Transform (FT or FFT) for such analysis. In addition, the data may be manipulated with various functions to facilitate the spectrum analysis. In accordance with embodiments of the invention, determination of dominant frequency ($\omega_D$) may be performed with any suitable methods, one of which is described in U.S. patent application Ser. No. 11/788,910, which is incorporated by reference in its entirety.

As noted above, attenuation of energies of seismic waves traveling in a formation can be caused by various factors, including the types and quantities of hydrocarbons in the formation. Such attenuation may vary as a function of the frequencies. Therefore, analysis of energy loss as a function of frequency around the dominant frequency ($\omega_D$) may provide some indication of the types and quantities of hydrocarbons in the formation. In particular, methods of the invention make use of the rates of energy loss at frequencies higher than the dominant frequency ($\omega_D$). There are numerous methods for determining the rate of energy loss on a spectrum above the dominant frequency ($\omega_D$). These methods include, but are not limited to, Delta-frequency ($\omega_{delta}$) as described herein, "$\omega_{f2}$" as described herein, and $1/Q_g$ where $Q_g$ is described in U.S. Pat. No. 7,243,029, which is incorporated by reference in its entirety.

Once dominant frequency ($\omega_D$) and a measure of the energy loss on the high-frequency side of the dominant frequency ($\omega_D$) have been determined, these two measurements can be interpreted directly to determine where they track and go lower (i.e., both values correlate and decrease) to identify the locations of hydrocarbon accumulations. Alternatively, these two measurements can be used as inputs to another algorithm to calculate a third dataset to identify regions of interest where the curves track and go lower.

The following description covers various illustrative embodiments of the invention. These systems and methods are not based on reflection-boundary analysis, but instead are based on changes to the seismic waves as they propagate through subsurface formations. As noted above, when the seismic waves propagate through subsurface formations, their energies are attenuated to various extents and in various manners, depending on the lithological properties of the formation including the matrix type, porosity, permeability, fluid type, temperature, and pressure along the paths of propagation. One skilled in the art will appreciate that the following description is for illustrative purpose only and various modifications are possible without departing from the scope of the invention.

FIG. 1 shows an illustrative context for use of the disclosed systems and methods. A seismic source 102 such as a vibrator truck, a small explosion, or an air gun (in underwater surveys), generates seismic waves that propagate through subsurface formations 104. As shown by a selected propagation path 106, the seismic waves reflect and refract at boundaries between subsurface formations 104, and eventually some of the reflected seismic waves reach an array of receivers 108. The array typically includes numerous receivers 108 spaced in a grid pattern. Receivers 108 convert seismic waves into electrical signals that are then recorded at a recording facility 110 such as a recorder truck. Eventually, the recorded data is transported or transmitted to a central facility 112 for analysis.

Seismic source 102 typically fires multiple times at different locations relative to the array of receivers 108. The array of receivers 108 may then be moved and the process may be repeated many times. The use of multiple source and receiver locations allows data from different propagation paths to be combined in a manner that attenuates noise.

Figure 2:
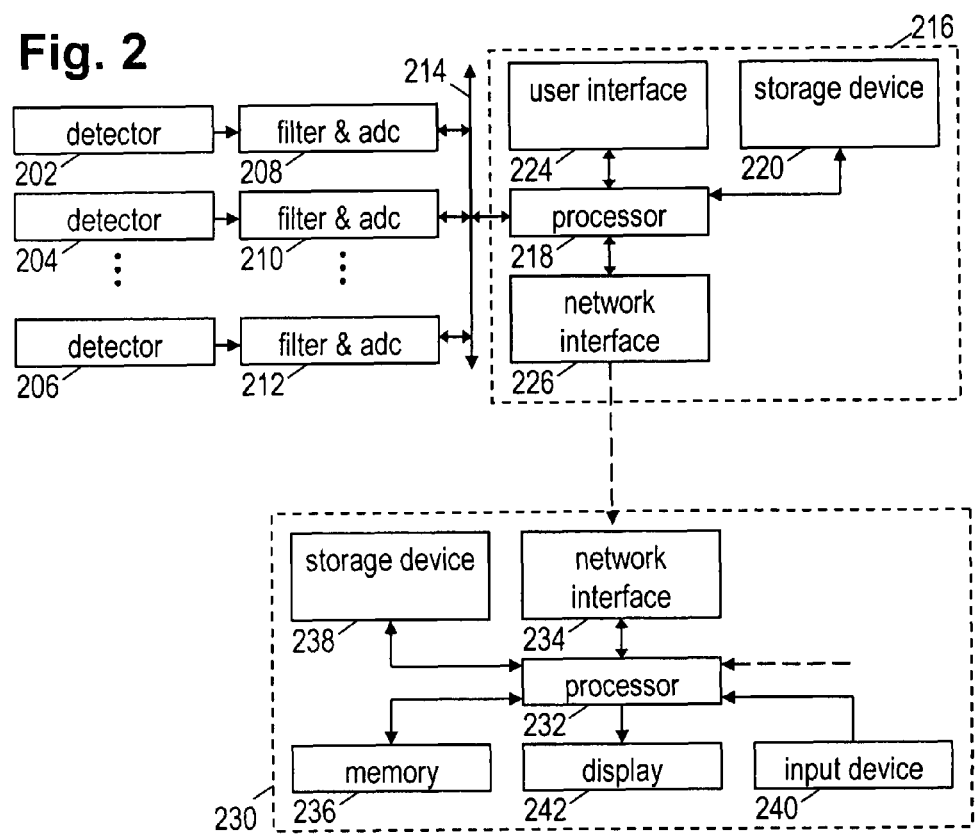
FIG. 2 shows a block diagram of various illustrative hydrocarbon detection systems.

FIG. 2 shows a block diagram of various systems and devices employed in gathering and analyzing seismic data. Detectors 202, 204, and 206 are transducers that convert seismic waves into electrical signals that are then amplified. Analog-to-digital converter (ADC) blocks 208, 210, and 212 receive the amplified electrical signals from detectors 202, 204, and 206, respectively. ADC blocks 208, 210, and 212 filter the amplified electrical signals and convert them to digital form. Digital sampling is performed at an interval of, for example, 1-4 milliseconds. Each receiver 108 may include at least one detector and ADC block.

A bus 214 couples ADC blocks 208, 210, and 212 to a recording system 216. Bus 214 is a simplified representation of multiple wires, cables and/or wireless connections with corresponding adapters.

Illustrative recording system 216 may include a processor 218, a storage device 220, a user interface 224, and a network interface 226. Processor 218, for example, may collect and format the digital data from the receivers and may store the digital data in files on storage device 220. Alternatively, the digital data may be streamed over a network for remote storage. The files may include header information regarding the data in the file, e.g., the number of array receivers, the bit resolution of the digitized samples, the sampling rate, the starting time and length of the recording period, and the positions of the source and each receiver in the array. The seismic data samples may be multiplexed and written into the file as they are received. A new file may be created for each firing of the seismic source 102.

The manner of collecting and recording the data may be controlled via a user interface 224. Typically, user interface 224 includes a display upon which processor 218 shows options that can be configured by the user, and a keypad or other input device that the user can use to communicate the desired configuration to the processor 218. Once surveying is completed, the seismic data files may be transported or transmitted to a hydrocarbon detection system 230 via network interface 226.

In accordance with one embodiment of the invention, hydrocarbon detection system 230 may be a general-purpose computer configured for operation as a hydrocarbon detection system through the use of software. System 230 may include a processor 232, a network interface 234, a memory device 236, a storage device 238, an input device 240, and a display device 242. Network interface 234 may couple processor 232 to recording system 216 allowing processor 232 to retrieve software and data stored on recording system 216. Software stored on memory device 236 may configure processor 232 to interact with a user via input device 240 and display 242.

The user may cause processor 232 to perform a seismic data file processing program stored on storage device 238. Processor 232 typically begins program execution by causing some or all of the program to be copied into memory 236 for fast access. With guidance from the user, the data file processing program may retrieve seismic data files from storage device 238. The data file processing program may then perform pre-stack processing on the data, stacks the data, and stores the stacked data as a new seismic data set.

The user may then cause processor 232 to execute a hydrocarbon detection program. As with the data file processing program, processor 232 may begin execution by copying the hydrocarbon detection program into memory 236. With guidance from the user, the hydrocarbon detection program may configure processor 232 to retrieve traces from the raw seismic data files and/or from the stacked seismic data set. The hydrocarbon detection program may configure processor 232 to process the traces as described in greater detail below, eventually producing a section(s) or volume(s) for viewing by the user.

The following discussion describes various illustrative methods implemented by system 230. The corresponding figures show exemplary methods in the form of flowcharts having blocks to represent component operations, and arrows to represent potential operation sequences. System 230 may carry out the component operations of the various methods in the sequences shown or in a different order, or alternatively, many of the operations may be re-ordered, or performed concurrently. The methods are ultimately carried out by hardware, but the methods' control logic may be implemented in the software, firmware, and or hardware of system 230.

Figure 3:
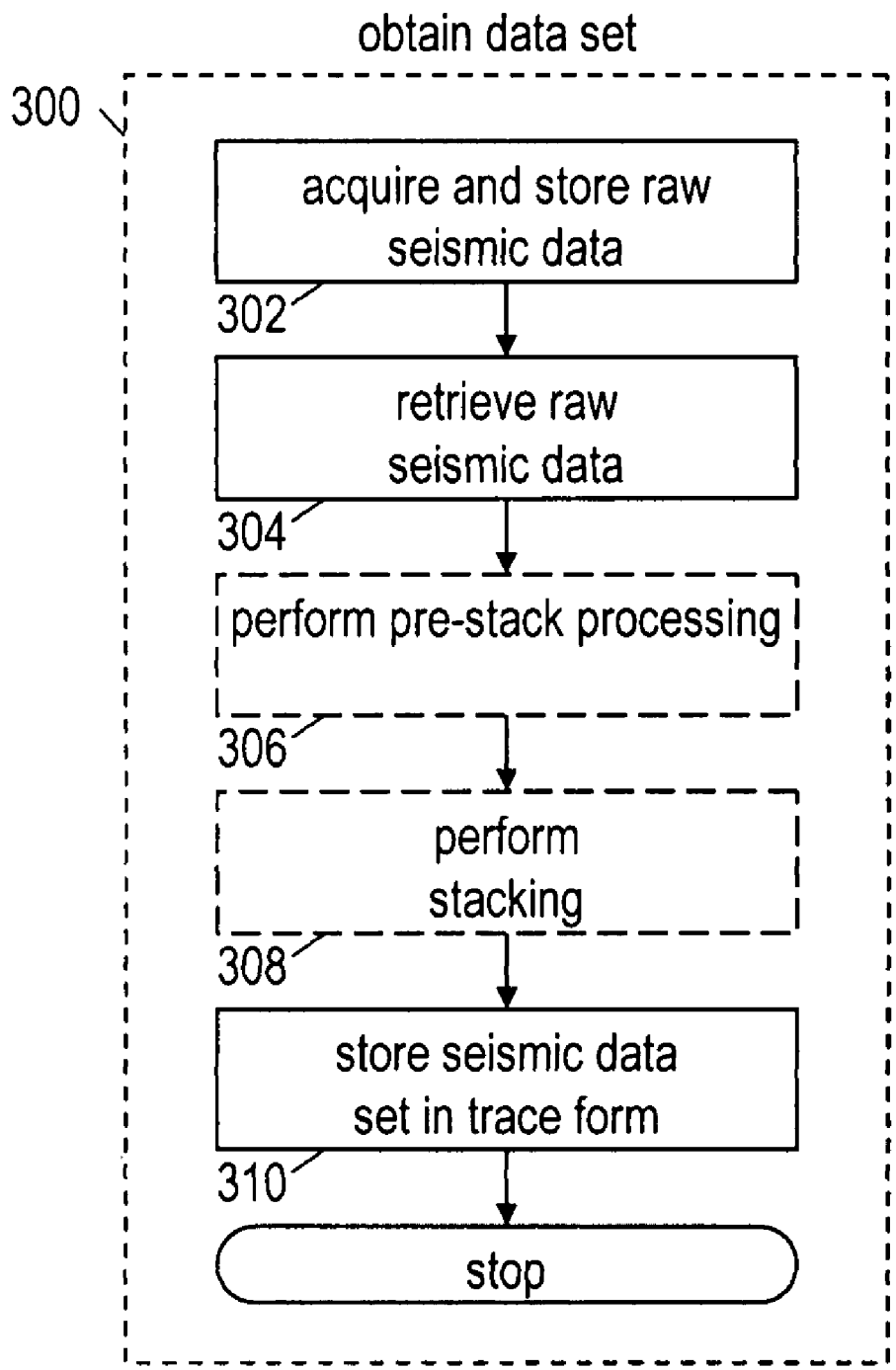
FIG. 3 shows a flowchart of an illustrative seismic data acquisition method.

In accordance with one embodiment of the invention, FIG. 3 shows a flowchart of an illustrative method 300 to obtain a seismic data set, including optional operations performed by a seismic data file processing program. In block 302, a recording system (shown as 216 in FIG. 2) acquires and records raw seismic data as described previously. In block 304, a hydrocarbon detection system (shown as 230 in FIG. 2) retrieves (with guidance from a user) the raw seismic data and reorders the digitized samples. As noted previously, recording system 216 may store the data as it is acquired. System 230 may convert the data file format to a trace-based format, i.e., the digitized samples are reordered to provide a separate time sequence for each receiver. System 230 may further associate each trace with a map location, which, for example, may be halfway between the receiver and the seismic source.

Method 300 includes two optional blocks 306 and 308, which can be omitted independently of each other. In block 306, system 230 may perform pre-stack processing. In block 308, system 230 may identify for each map location those traces having the map location as a midpoint between the receiver and the seismic source. These traces may be sorted based on offset, i.e., the distance between the map location and the receiver. System 230 then averages ("stacks") the identified traces having a common offset. Note that in some stacking variations, system 230 may stack all the identified traces for a map location, after first stretching the traces in the time domain as a function of offset and estimated velocities. Stacking operation 308 further enhances the signal to noise ratio of the traces. In block 310, system 230 may store the reformatted (and optionally filtered and stacked) seismic data set on storage device (shown as 238 in FIG. 2).

Most seismic data processing software is configured to access seismic data in this trace-based format. Accordingly, system 230 may perform multiple hydrocarbon detection techniques without repeating the foregoing operations.

Figure 4:
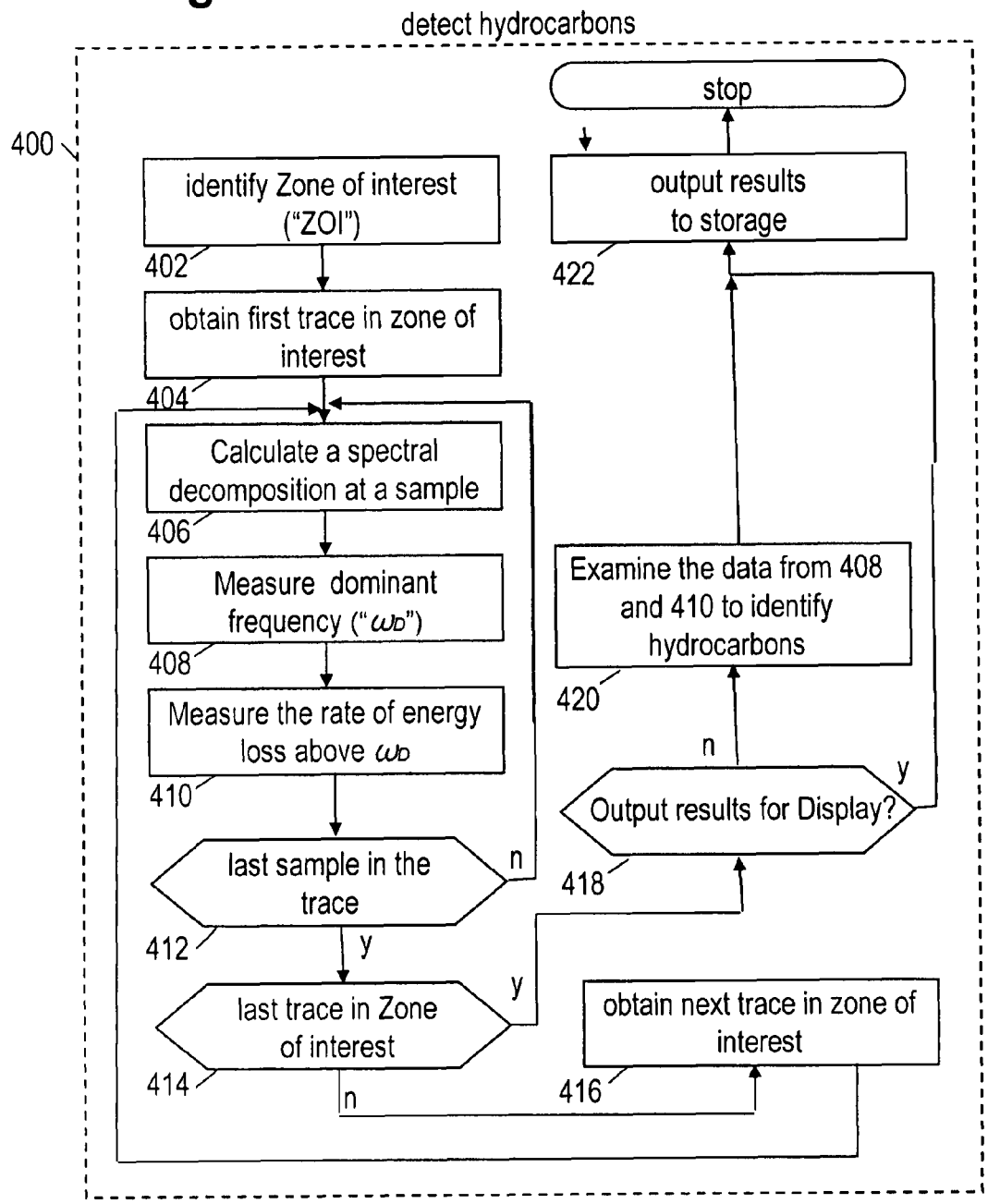
FIG. 4 shows a flowchart of an illustrative hydrocarbon detection method.

FIG. 4 shows a flowchart illustration of a hydrocarbon detection method 400 in accordance with one embodiment of the invention. Beginning in block 402, system 230 identifies (with guidance from a user) a zone of interest in the seismic dataset. The zone of interest may include the entire seismic data volume, or be a subset of the dataset. In block 404, system 230 begins working through the zone of interest systematically, obtaining a first trace from the seismic data set.

In block 406, system 230 calculates a frequency spectrum at each sample of interest in the seismic data, which is called a spectral decomposition at a sample (e.g., a selected window or interval on a trace). There are numerous methods of calculating a spectral decomposition at a sample. One example of such spectral decomposition is discussed in patent application number U.S. patent application Ser. No. 11/788,910.

In block 408, system 230 measures dominant frequency ($\omega_D$) and outputs this measurement to a storage device for a sample. A dominant frequency ($\omega_D$) is defined as the frequency at which a the spectrum has the maximum magnitude. The method for determining the dominant frequency ($\omega_D$) may include first calculating a signal spectrum (or a smooth signal spectrum) of the sample. The maximum magnitude of the signal spectrum or the smooth signal spectrum then defines the dominant frequency ($\omega_D$). The approach involving a smooth signal spectrum is described in U.S. patent application Ser. No. 11/788,910. However, methods of the invention do not necessarily involve the calculation of a smooth signal spectrum. Instead, methods of the invention may also determine the dominant frequency ($\omega_D$) without first calculating a smooth signal spectrum.

In block 410, system 230 measures energy loss (or rate of energy loss) on the high-frequency side of the dominant frequency ($\omega_D$) and outputs this measurement for a sample to a storage device. There are several approaches to determining the rate of such energy loss. One example is to set a threshold level in the spectrum analysis and use the intercept where the threshold level intersects the spectral curve on the high side of dominant frequency ($\omega_D$) as an indicator. The frequency at which this intercept occurs may be used as an indicator of the rate of energy loss. Alternatively, the difference between the dominant frequency ($\omega_D$) and the frequency of this intercept point may be used as an indicator.

In block 412, system 230 determines whether the last sample on the trace being analyzed has been examined. If not, system 230 returns to block 406 in order to examine the next sample. If the last sample has been analyzed in the trace, then system 230 proceeds to block 414.

In block 414, system 230 determine whether the last trace in the zone of interest has been examined. If not, system 230 proceeds to block 416 to obtain the next trace for analysis and the steps of 406-414 are repeated for the next trace. If block 414 determines that the last trace has been analyzed, system 230 proceeds to block 418 to output the results.

In block 418, system 230 determines if the user desires further analysis of the results produced in blocks 408 and 410. If no, system 230 proceeds to block 422. If yes, system 230 proceeds to block 420.

In block 420, system 230 performs further analysis on the results produced in blocks 408 and 410. This analysis may consist of various algorithms in order to highlight places where the dominant frequency ($\omega_D$) and the measure of energy loss on the high-frequency side of the dominant frequency ($\omega_D$) track and go lower, i.e., both parameters correlate and decrease in values at the location, which indicates the presence of hydrocarbons. Note that the hydrocarbons may include gas or liquid form of hydrocarbons.

In block 422, system 230 outputs the results to storage or to the user.

This Dominant Frequency $\omega_D$ is independent of amplitude of the seismic signals but is dependent on the interplay of, among other things, reservoir fluid properties (gas, oil, water and/or a mixture thereof), reservoir porosity, permeability, and the spectral shape and energy level of the seismic wave just before it enters the hydrocarbon reservoir.

Figure 5:
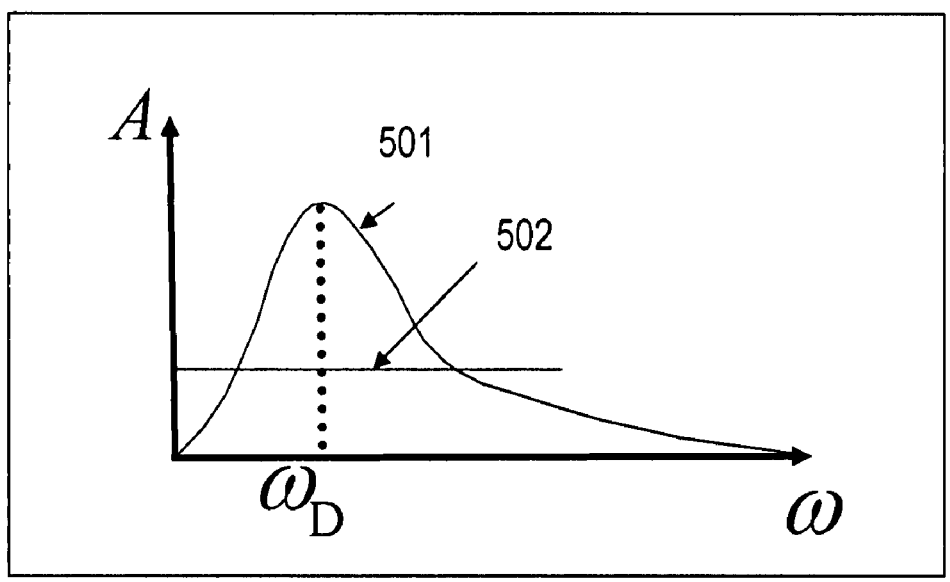
FIG. 5 also shows graphically a user defined threshold level for deriving a measure of energy loss on the high-frequency side of the dominant frequency ("$\omega_D$").

FIG. 5 shows a spectrum calculated at a sample as curve 501 and a user defined threshold 502. The threshold 502 may be defined at any level between zero and the level of the dominant. Reasonable values would be between 1% of the dominant level and 30% of the dominant level. It is desirable to set this level above zero to avoid large changes in the measured value caused by tiny changes in the level. It is also desirable to set this level below the dominant level since at this level the measured value goes to zero. The selection of a threshold is interpretational and is made partially based on the interpreted noise level in the spectrum the objective being to set the threshold above the noise level.

Figure 6:
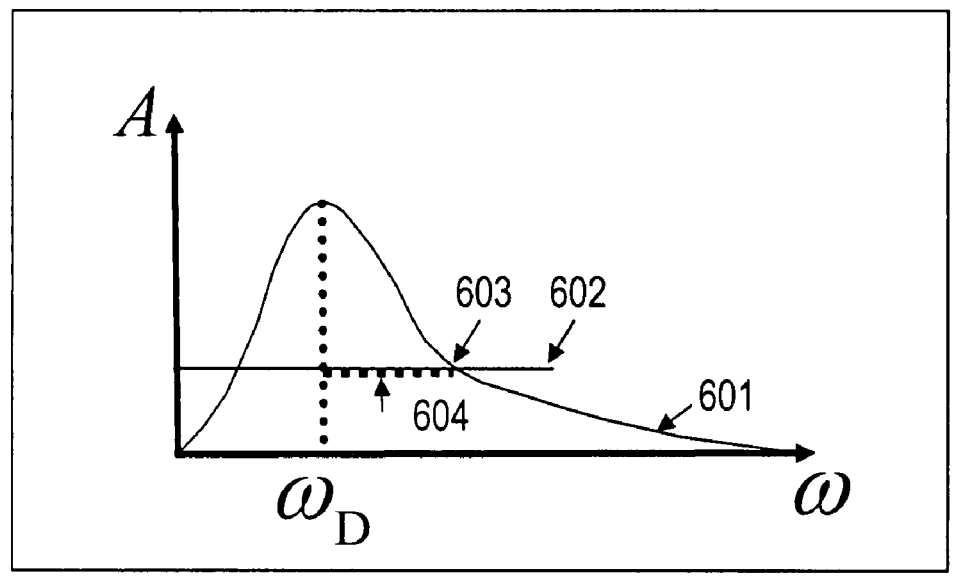
FIG. 6 shows graphically the measurement the delta-frequency ("$\omega_{delta}$") and $\omega_{f2}$.

FIG. 6 shows a spectrum calculated at a sample as curve 601 and the point $\omega_{F2}$ labeled as 603, at which the spectrum calculated at a sample intersects the user defined threshold 602 at a frequency higher than the dominant frequency, $\omega_D$. The distance in hertz between $\omega_{F2}$ and $\omega_D$ is delta-frequency, which may be expressed as $$\omega_{F2} - \omega_D = \omega_{Delta} \quad (3)$$

This Delta Frequency $\omega_{Delta}$ is independent of amplitudes of the seismic signals, but dependent on the interplay of, for example, reservoir fluid properties (gas, oil, water and a mixture thereof), reservoir porosity, reservoir permeability, and the spectrum shape and energy level of the spectrum calculated at a sample as it exists just before it enters the hydrocarbon reservoir.

Similarly, the $\omega_{F2}$ is independent of amplitudes of the seismic signals, but dependent on the interplay of, for example, reservoir fluid properties (gas, oil, water and a mixture thereof), reservoir porosity, reservoir permeability, and the spectrum shape and energy level of the spectrum calculated at a sample as it exists just before it enters the hydrocarbon reservoir.

Referring again to FIG. 4, in block 408, system 230 may identify the dominant frequency $\omega_D$ of the spectrum calculated at a sample.

Referring again to FIG. 4, in block 410, system 230 may calculate the delta-frequency $\omega_{Delta}$ of the spectrum calculated at a sample, the $\omega_{F2}$ of the spectrum calculated at a sample, or $1/Q_g$ (wherein $Q_g$ is a gas absorption factor that characterizes the rate of signal attenuation of the spectrum on the high-frequency side of the dominant frequency (i.e., $\omega > \omega_D$), as described in U.S. Pat. No. 7,243,029) of the spectrum calculated at a sample, or make some other measurement of the rate of energy loss above dominant frequency $\omega_D$ (i.e., $\omega > \omega_D$).

In block 416, system 230 determines whether the last time interval in the region of interest for the trace has been processed. If not, system 230 selects the next trace of interest to process and repeats the operations of blocks 406-416 until all the trace's time intervals that are in the region of interest have been processed. Once the dominant frequency value $\omega_D$ and the delta frequency $\omega_{Delta}$ (or the $\omega_{F2}$) have been determined for each sample in the region of interest on a trace, system 230 progresses from block 414 to block 418. At this point, system 230 contains values for $\omega_D$ and $\omega_{Delta}$ (or $\omega_{F2}$ or $1/Q_g$) at each sample. These values can be shown as curves, i.e., plotted as a function of time for the trace, for interpretation.

Alternatively, system 230 may progress from block 418 to block 420 and examine these $\omega_D$ and $\omega_{Delta}$ (or $\omega_{F2}$ or $1/Q_g$) datasets to determine where the dominant frequency value $\omega_D$ and the measurement of energy loss above the dominant frequency value $\omega_D$ (e.g. $\omega_{Delta}$ or $\omega_{F2}$ or $1/Q_g$) track and go lower (i.e., both parameters correlate and decrease in values).

The processing in block 420 may take various forms. As one example, System 230 may determine that an anomaly exists where the $\omega_D$ and $\omega_{Delta}$ or $\omega_{F2}$ curves track and go lower. Different energy level threshold 602 amounts may be configured by the user. "Anomaly" as used herein refers to values where $\omega_D$ and $\omega_{Delta}$ curves track and go lower in a region as compared with the neighboring regions.

In block 422, system 230 outputs the measurements of dominant frequency $\omega_D$, delta frequency $\omega_{Delta}$, $\omega_{F2}$, $1/Q_g$, or a combination thereof. In addition, one skilled in the art would appreciate that systems 230 may also output any computed datasets that used these parameters as inputs.

Once all selected traces have been processed, system 230 may display the dominant frequency $\omega_D$ and/or delta frequency $\omega_{Delta}$ and/or $\omega_{F2}$ anomalies and/or $1/Q_g$ and/or anomalies identified by displaying or using $\omega_D$ and $\omega_{Delta}$ (or $\omega_{F2}$ or $1/Q_g$) curves in conjunction. The display format is configurable. Thus, the anomalies may be viewed as a function of one dimension (e.g. a time axis for a trace), two dimensions (e.g. a map view, a contour map, a color coded map, or a vertical cross-section), or three dimensions, (e.g. a plan view map of the results shown in color to represent the magnitude of the results overlaid on top of a time or depth structure maps) or more. Dominant frequency $\omega_D$ and/or delta frequency $\omega_{Delta}$ and/or $\omega_{F2}$ anomalies and/or $1/Q_g$ and/or anomalies identified by displaying or using $\omega_D$ and $\omega_{Delta}$ (or $\omega_{F2}$ or $1/Q_g$) curves in conjunction may also be overlaid on views of seismic trace data in section view or in plan view by contours (e.g. time or depth contours).

Though the foregoing methods and operations have been described with respect to seismic trace data having a time axis, they may readily be adapted to seismic trace data having a depth axis.

In accordance with some embodiments of the invention, any known 3D digital output format may be used with embodiments of the invention, such as SEGY format (Barry et al., "Recommended Standards for Digital Tape Formats," Digital Tape Standards, Society of Exploration Geophysics, 1980).

Figure 7:
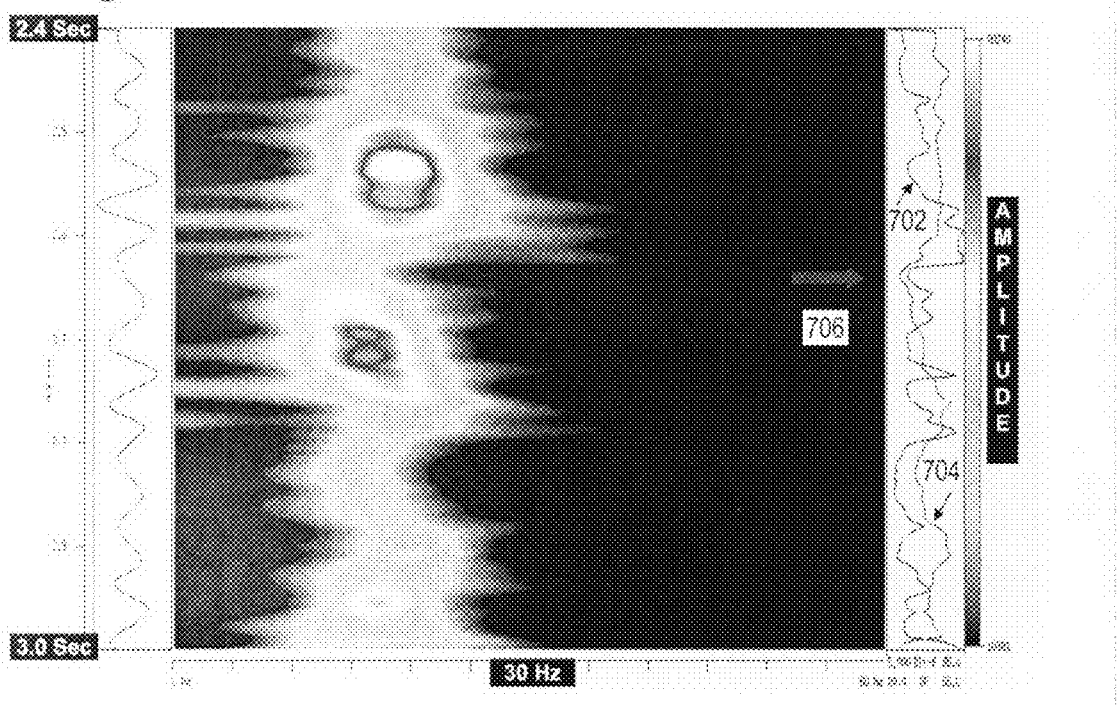
FIG. 7 shows a graph illustrating how dominant frequency ("$\omega_D$") and a measure of energy loss (e.g. delta-frequency ($\omega_{delta}$) or $\omega_{f2}$) can be used to locate a hydrocarbon reservoir.

FIG. 7 shows an example of spectral decompositions on a trace of data at time samples between 2.4 seconds and 3.0 seconds. The vertical axis is time. The horizontal axis is frequency and the amplitude of a time-frequency value is shown in color. Also shown in FIG. 7 is the measurement of delta frequency $\omega_{Delta}$ shown as a curve labeled 702. Also shown in FIG. 7 is the measurement of dominant frequency $\omega_D$ shown as a curve labeled 704. Also shown in FIG. 7 is a location where dominant frequency $\omega_D$ and delta frequency $\omega_{Delta}$ track and go lower. This location is labeled 706. Locations such as the one labeled 706 indicate locations containing hydrocarbons.

While specific embodiments of the invention have been disclosed and described above, the invention is not limited by the discussion, but instead is limited only by the scope of the appended claims.

What is claimed is:

1. A method for detecting hydrocarbons, comprising:
   obtaining seismic trace data for a region of interest;
   processing, using a processor, the seismic trace data to calculate at least one spectrum for at least one sample from the seismic data;
   calculating at least one dominant frequency ($\omega_D$) for the at least one spectrum;
   calculating at least one measure of energy loss at frequencies above the at least one dominant frequency ($\omega_D$) on the at least one spectrum; and
   locating a hydrocarbon reservoir in the region of interest using the at least one dominant frequency ($\omega_D$) and the at least one measure of energy loss.

2. The method of claim 1, wherein the locating involves identifying a region where the at least one dominant frequency ($\omega_D$) and the at least one measure of energy loss both decrease in values.

3. The method of claim 1, wherein the measure of energy loss is $\omega_{F2}$, which is the frequency at which the calculated spectrum crosses a selected threshold on the high-frequency side of the dominant frequency ($\omega_D$).

4. The method of claim 3, wherein the measure of energy loss is $\omega_{Delta}$, wherein $\omega_{Delta} = \omega_{F2} - \omega_D$.

5. The method of claim 1, wherein the processing the seismic trace data to calculate at least one spectrum comprises calculating at least one smooth signal spectrum.

6. The method of claim 5, wherein the measure of energy loss is $\omega_{F2}$, which is the frequency at which the calculated spectrum crosses a selected threshold on the high-frequency side of the dominant frequency ($\omega_D$).

7. The method of claim 6, wherein the measure of energy loss is $\omega_{Delta}$, wherein $\omega_{Delta} = \omega_{F2} - \omega_D$.

8. The method of claim 1, wherein the measure of energy loss is $1/Q_g$, wherein $Q_g$ is a gas absorption factor that characterizes the rate of signal attenuation of the spectrum on the high-frequency side of the dominant frequency ($\omega_D$).

9. The method of claim 8, wherein the locating comprising identifying where values of the dominant frequencies ($\omega_D$) and $1/Q_g$ both decrease in value.

* * * * *